C. S. GREEN & A. CONNORS.
VEHICLE SPRING.
APPLICATION FILED DEC. 20, 1911.
1,066,602.
Patented July 8, 1913.
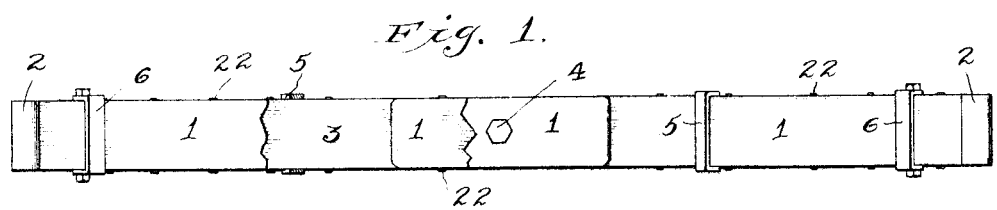
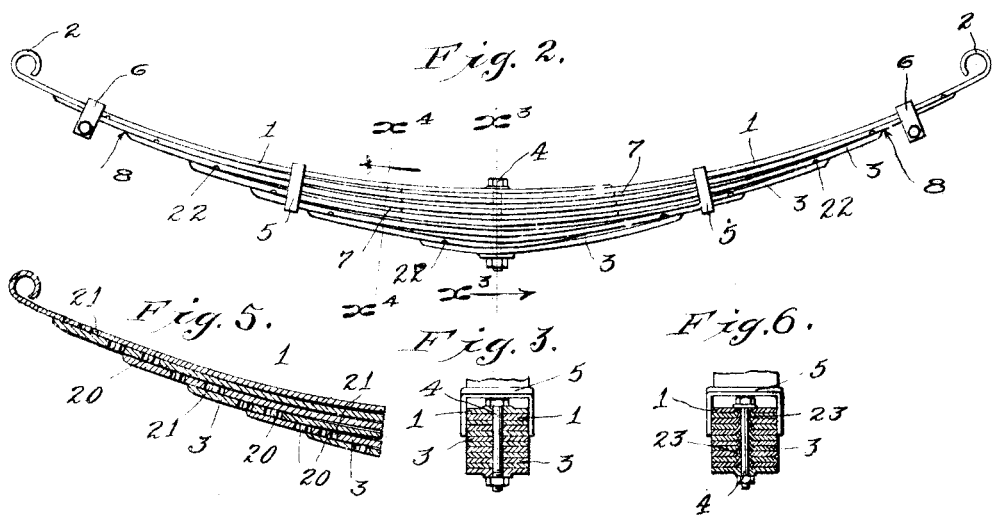
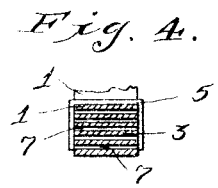
Witnesses:
Inventors:
Clarence Seymour Green
Alfred Connors.

UNITED STATES PATENT OFFICE.

CLARENCE SEYMOUR GREEN AND ALFRED CONNORS, OF MARICOPA, CALIFORNIA.

VEHICLE-SPRING.

1,066,602.

Specification of Letters Patent.

Patented July 8, 1913.

Application filed December 20, 1911. Serial No. 667,027.

*To all whom it may concern:*

Be it known that we, CLARENCE SEYMOUR GREEN and ALFRED CONNORS, citizens of the United States, residing at Maricopa, in the county of Kern and State of California, have invented a new and useful Vehicle-Spring, of which the following is a specification.

One object of the present invention is to lessen the expansion and contraction of the steel in vehicle springs.

Another object of the invention is to make the spring more pliable in its action.

A further object of the invention is to absorb the jar of rebound.

Other objects of the invention will appear hereinafter.

The accompanying drawings illustrate embodiments of the invention, and referring thereto: Figure 1 is a plan of the spring, partly broken away. Fig. 2 is a side elevation thereof. Fig. 3 is a section on line $x^3$—$x^3$ in Fig. 2. Fig. 4 is a section on line $x^4$—$x^4$ in Fig. 2. Fig. 5 is a partial vertical section of the spring. Fig. 6 shows a modified form of connecting the spring leaves at the center thereof.

Referring to Figs. 1 to 4, the spring is composed of two series of leaves or members, overlapping at the center of the spring, and extending outwardly from said overlapping portions at each side, and curved to form in conjunction, a semi-elliptic or similar spring. Said series of spring members at each side may comprise an upper leaf 1, formed with an eye 2 at its outer end for attachment of the parts to be supported, and any desired number of lower leaves 3, said leaves 1 and 3 being arranged one below another and secured in contact at their central overlapping portions by a fastening bolt 4. The portions of the several leaves which extend beyond the overlapping part at each side, are separated from the leaves above and below the same by spaces 7, but converge together so that their outer portions are in contact as shown at 8 and are secured in such contact by clamping means 5 and 6. By reason of the spaces 7 aforesaid between adjacent leaves, the pliability of the springs is increased. The semi-elliptic spring built up in this manner may be used in the same manner as the usual semi-elliptic spring, either in conjunction with other springs or by itself.

As shown in Fig. 5, each of the spring leaves may be connected to the leaves above and below the same by pins or teats 20 on the leaves, extending into slots 21 on the adjacent leaves, and by lugs or lips 22 extending upwardly from each spring, and embracing the overlying spring, or either of these connecting means may be used without the other. At the center of the spring the leaves may be formed with a hole or slot as shown in Fig. 3, for receiving the bolt, or as shown in Fig. 6, each leaf may be provided with a conical portion 23 engaging with corresponding conical portions in the next higher leaf, these conical portions being bored to receive the bolt.

It will be understood that the invention is applicable to any style or shape of spring, to any thickness and to any width of spring leaves, and to any number of leaves.

An important advantage of the invention is that it lessens the crystallization of the steel used in the springs.

What we claim is:

1. A vehicle spring, comprising two series of leaves overlapping and in contact at their inner ends, and converging so as to be in contact at their outer ends, and means for clamping the overlapping inner end portions of said leaves together, each spring being spaced from the adjoining leaf on the same side by the overlapping portion of the leaves of the series on the opposite side.

2. A vehicle spring, comprising two series of leaves overlapping and in contact at their inner ends, and converging so as to be in contact at their outer ends, means for clamping the overlapping inner end portions of said leaves together, each spring being spaced from the adjoining leaf on the same side by the overlapping portion of the leaves of the series on the opposite side, and clamping means at the outer portions of said leaves, securing such portions together.

In testimony whereof, we have hereunto set our hands at Maricopa, California, this 12" day of December, 1911.

CLARENCE SEYMOUR GREEN.
ALFRED CONNORS.

In presence of—
H. A. PETERSON,
C. Z. VANDER HOREK.